United States Patent [19]

Chang

[11] Patent Number: 5,046,808
[45] Date of Patent: Sep. 10, 1991

[54] INTEGRATED OPTICS CHIP AND METHOD OF CONNECTING OPTICAL FIBER THERETO

[75] Inventor: Chin-Lung Chang, West Covina, Calif.

[73] Assignee: Litton Systems, Inc., Beverly Hills, Calif.

[21] Appl. No.: 451,588

[22] Filed: Dec. 18, 1989

[51] Int. Cl.⁵ .............................................. G02B 6/30
[52] U.S. Cl. ...................................... 385/13; 385/14; 385/49
[58] Field of Search ............... 350/96.17, 96.11, 96.12, 350/96.15

[56] References Cited

U.S. PATENT DOCUMENTS

| | | | |
|---|---|---|---|
| 4,838,989 | 6/1989 | Ashby et al. | 156/628 |
| 4,842,358 | 6/1989 | Hall | 350/96.15 |
| 4,842,367 | 6/1989 | Djupsjöbacka | 350/96.15 X |
| 4,871,226 | 10/1989 | Courtney et al. | 350/96.17 |
| 4,883,743 | 11/1989 | Booth et al. | 350/96.17 X |
| 4,904,038 | 2/1990 | Chang | 350/96.14 |
| 4,943,130 | 7/1990 | Dannoux et al. | 350/96.11 X |

FOREIGN PATENT DOCUMENTS

| | | |
|---|---|---|
| 20288301 | 3/1988 | European Pat. Off. . |
| 0007948 | 1/1979 | Japan ............... 350/96.17 |
| 0231407 | 9/1988 | Japan ............... 350/96.17 |
| 1437792 | 1/1973 | United Kingdom . |

OTHER PUBLICATIONS

Ashby et al., "Laser-Driven Chemical Reaction for Etching LiNbO3," Applied Physics Letters, vol. 49, No. 8, Aug. 1986.
Nutt et al., "Fiber-to-Waveguide Coupling Using Ion-Milled Grooves in Lithium Niobate at 1.3-um Wavelength," Optics Letters, vol. 9, No. 10, Oct. 1984.
Elliot, Integrated Circuit Fabrication Technology, McGraw-Hill, 1982, p. 282.

Primary Examiner—William L. Sikes
Assistant Examiner—Phan T. Heartney
Attorney, Agent, or Firm—Lynn & Lynn

[57] ABSTRACT

An integrated optics chip eliminates problems caused by polarization cross coupling in fiber optic rotation sensors without requiring time consuming and expensive alignment of the axes of the optical fiber sensing coil and the optical waveguides formed in the integrated optics chip. A substrate formed of an optically active material has slots formed therein for mounting optical fibers to the substrate. An optical waveguide is formed in the integrated optics chip to guide optical signals along a selected axis of propagation such that an end wall of the slot includes an end surface of the optical waveguide. The end surface of the optical waveguide is formed to make an angle with the direction of propagation of light in the optical waveguide to reduce the amount of light reflected at the end surface of the optical waveguide. The angle of the end of the optical waveguide is formed such that light reflected at the interface back into the optical fiber impinges on the core/cladding boundary at an angle that permits refraction from the core into the cladding. The angle of the end of the optical waveguide preferably is in the range of 5° to 25°.

8 Claims, 2 Drawing Sheets

INTEGRATED OPTICS CHIP AND METHOD OF CONNECTING OPTICAL FIBER THERETO

BACKGROUND OF THE INVENTION

This invention relates generally to apparatus and methods for connecting optical fibers to integrated optics chips. In particular, this invention relates to apparatus and methods for interfacing optical fibers and integrated optics chips used in forming a Sagnac ring rotation sensor.

Many optical systems include both integrated optics devices and optical fibers. For example one technique for forming a rotation sensor that uses the phase difference between counterpropagating waves in a coil of optical fiber involves forming apparatus for processing and controlling the optical signals on an integrated optics chip and connecting the ends of the coil of optical fiber to waveguides formed in the chip. A Y-shaped coupler is formed at the intersection of three optical waveguides in the integrated optics chip. Light from the light source is input to one of the waveguides, which then guides the input light to the Y-shaped coupler. The Y-shaped coupler then divides the light into two beams that from the counterpropagating waves in the fiber optic sensing coil.

Prior methods of connecting optical fibers to integrated optics chips typically involve forming V-shaped grooves in silicon substrates. To mount a fiber optic rotation sensing coil to an integrated optics chip, the fibers are placed in the V-shaped grooves to position the fibers such that the ends of the fiber optic coil are spaced apart by a distance equal to the distance between the ends of the integrated optics waveguides to which the fibers are to be connected.

To satisfactorily pigtail the optical fibers to the integrated optics chip, both the end facets of the integrated optics chip and the V-shaped grooves must be polished. Angled facets are required for both the V-shaped groove assembly and the integrated optics chip to reduce Fresnel reflections at the butt joints between the optical fiber and the integrated optics chip.

Polarization cross coupling, in which light of one polarization couples into the another polarization is a source of error in fiber optic rotation sensors. In most fiber optic rotation sensor systems the principal axes of the birefringent optical fibers and the integrated optics waveguides must be accurately aligned to minimize polarization cross coupling. Aligning the principal axes is very labor intensive and therefore expensive. In addition, connecting the pigtailed integrated optics chip and optical fiber by conventional methods does not produce a joint that is sufficiently rigid to withstand the severe shocks and vibrations to which a navigation or guidance system including a fiber optic rotation sensor could be subjected.

SUMMARY OF THE INVENTION

The present invention provides an integrated optics chip that eliminates problems caused by polarization cross coupling in fiber optic rotation sensors without requiring time consuming and expensive alignment of the axes of the optical fiber sensing coil and the optical waveguides formed in the integrated optics chip.

An integrated optics chip according to the present invention comprises a substrate formed of an optically active material and having a slot formed therein. An optical waveguide is formed in the integrated optics chip to guide optical signals along a selected axis of propagation such that an end wall of the slot includes an end surface of the optical waveguide. The end surface of the optical waveguide is formed to make an angle with the direction of propagation of light in the optical waveguide to reduce the amount of light reflected at the end surface of the optical waveguide.

The slot is formed to receive therein a length of an optical fiber that is butt-coupled to the end surface of the optical waveguide to form an interface such that light may propagate between the optical waveguide and the optical fiber. The angle of the end of the optical waveguide is formed such that light reflected at the interface back into the optical fiber impinges on the core/cladding boundary at an angle that permits refraction from the core into the cladding. The angle of the end of the optical waveguide preferably is in the range of 5° to 25°.

The integrated optics chip according to the present invention preferably includes first, second and third optical waveguides formed in the substrate to guide optical signals along selected axes of propagation. Slots in the integrated optics chip are formed in edges of the integrated optics chip to correspond to the optical waveguides such that an end wall of each slot includes an end surface of the corresponding optical waveguide. The first, second and third optical waveguides are connected at a junction to form a Y-coupler such that optical signals intput to the integrated optics chip at the first optical waveguide propagate to the Y-coupler and divide between the second and third optical waveguides and optical signals input to the integrated optics chip at the second and third optical waveguides combine at the Y-coupler and interfere with one another.

The present invention may includes a fiber optic rotation sensor formed to include the integrated optics chip described above.

DESCRIPTION OF THE PREFERRED EMBODIMENT

Figure 1:
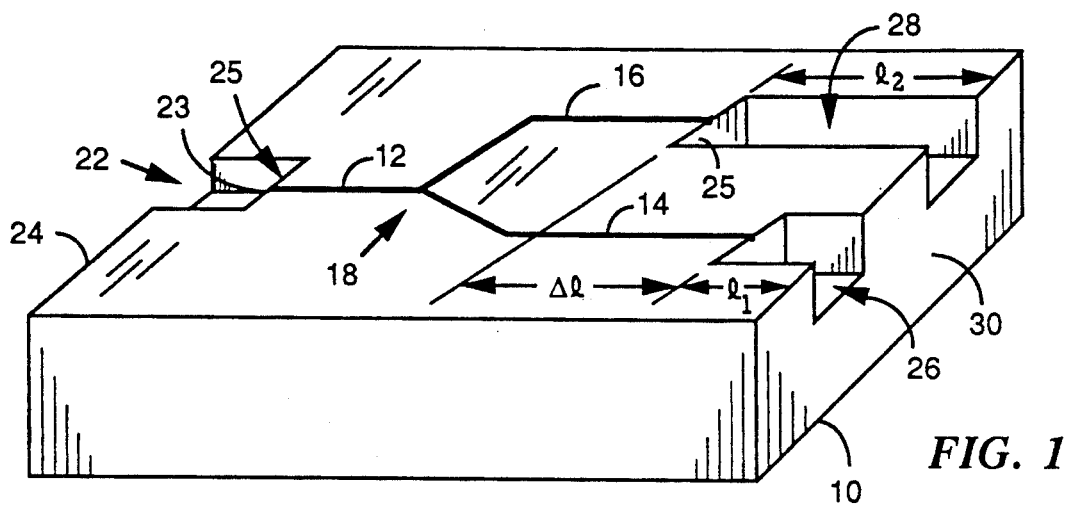
FIG. 1 is a perspective view of an integrated optics chip showing coupling grooves formed according to the invention in the ends of waveguides that form a Y-shaped coupler on the integrated optics chip.
Figure 2:
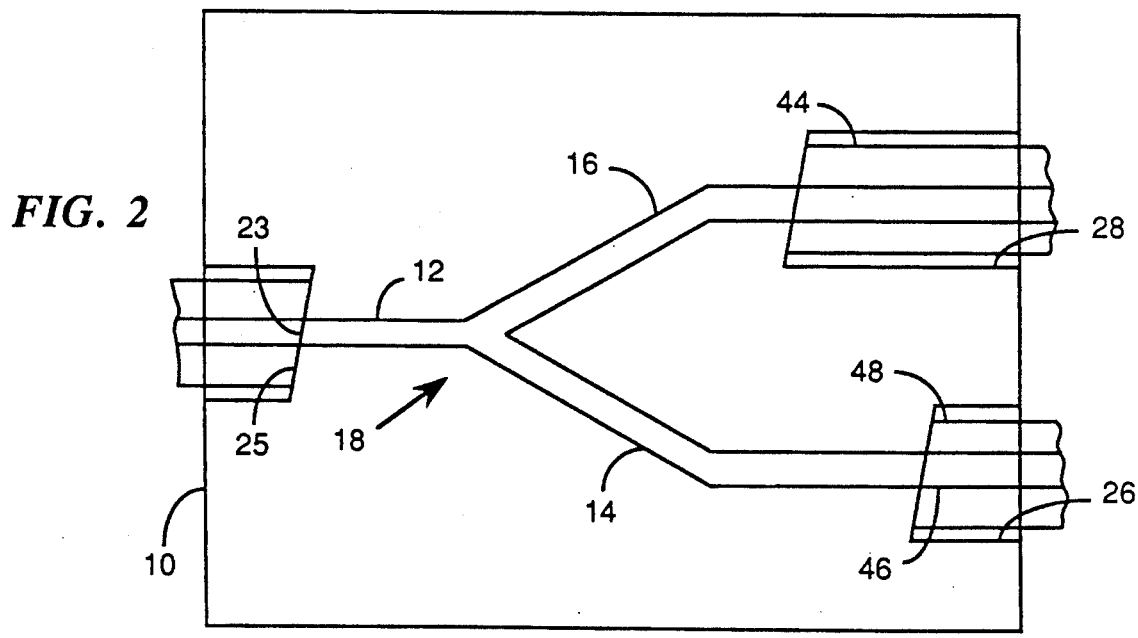
FIG. 2 is a top plan view of the integrated optics chip of FIG. 1.

Referring to FIGS. 1 and 2, an integrated optics chip 10 is preferably formed of an optically active material such as lithium niobate. Three optical waveguides 12, 14 and 16 are formed in the integrated optics chip 10. The optical waveguide may be formed by masking the substrate and doping it with titanium ions using techniques described in U.S. Pat. No. 4,904,038, issued Feb.

27, 1990 to Chang and owned by the assignee of the present invention. The disclosure of that application is hereby incorporated by reference into the present disclosure.

The waveguides 12, 14 and 16 meet at a junction 18. Therefore, light input to the waveguide 12 from the left as viewed in FIG. 1 will divide between the waveguides 14 and 16 at the junction 18. Light input to the waveguides 14 and 16 combines at the junction 18 and enters the waveguide 12.

A slot 22 is formed in the integrated optics chip 10 at an end face 24 so that an end 23 of the waveguide 12 abuts an end wall 25 in the slot 22. The waveguides 14 and 16 abut slots 26 and 28, respectively, that are formed in an end face 30 of the integrated optics chip 10. Two of the slots, for example the slots 22 and 26, may be substantially identical with the only essential difference being that they are formed on different end faces of the integrated optics chip 10.

However, the slots 26 and 28 are formed so that one of them, for example, the slot 28 extends into the integrated optics chip 10 a distance greater than the slot 26. The slot 26 has a length $l_1$ that is less than the length $l_2$ of the slot 28. The difference in the lengths of the slots is $\Delta l = l_2 - l_1$. The waveguides 14 and 16 thus differ in length by $\Delta l$.

Figure 3:
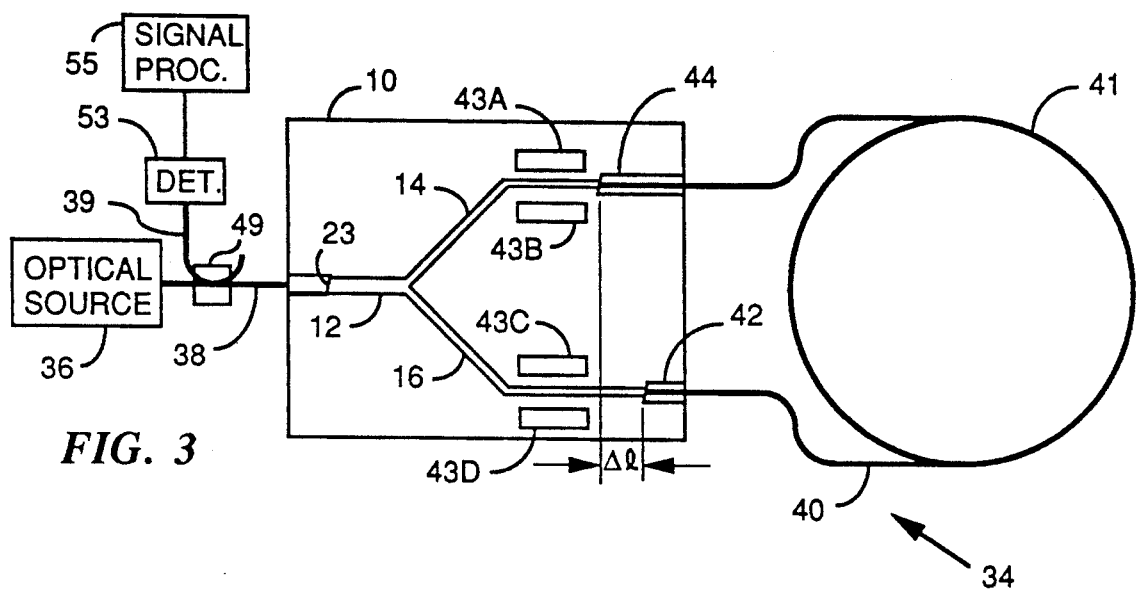
FIG. 3 is a top plan view showing the integrated optics chip of FIGS. 1 and 2 connected to an optical fiber sensing coil and an optical fiber that inputs light to the waveguides formed on the chip.

Referring to FIG. 3, the integrated optics chip 10 may be used in a rotation sensing system 34 that includes an optical signal source 36, an optical fiber 38 and an optical fiber 40 having a sensing coil 41 formed therein. A plurality of electrodes 43A–43D may be formed on the substrate 10 to provide means for modulating the phase of optical signals guided by the waveguides 14 and 16. The electrodes 43A and 43B may be formed on opposite sides of the waveguide 14 and the electrodes 43C and 43D may be formed on opposite sides of the waveguide 16. Other electrodes (not shown) may be formed on the substrate for modulating the birefringence of the junction 18 or for polarizing optical signals guided by the waveguide 12.

Figure 5:
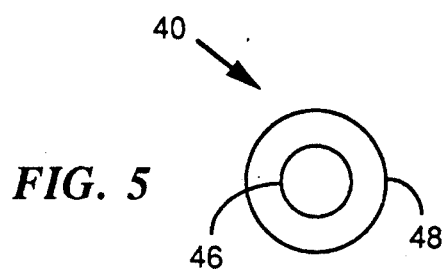
FIG. 5 is an end view of the optical fiber of FIG. 4.
Figure 4:
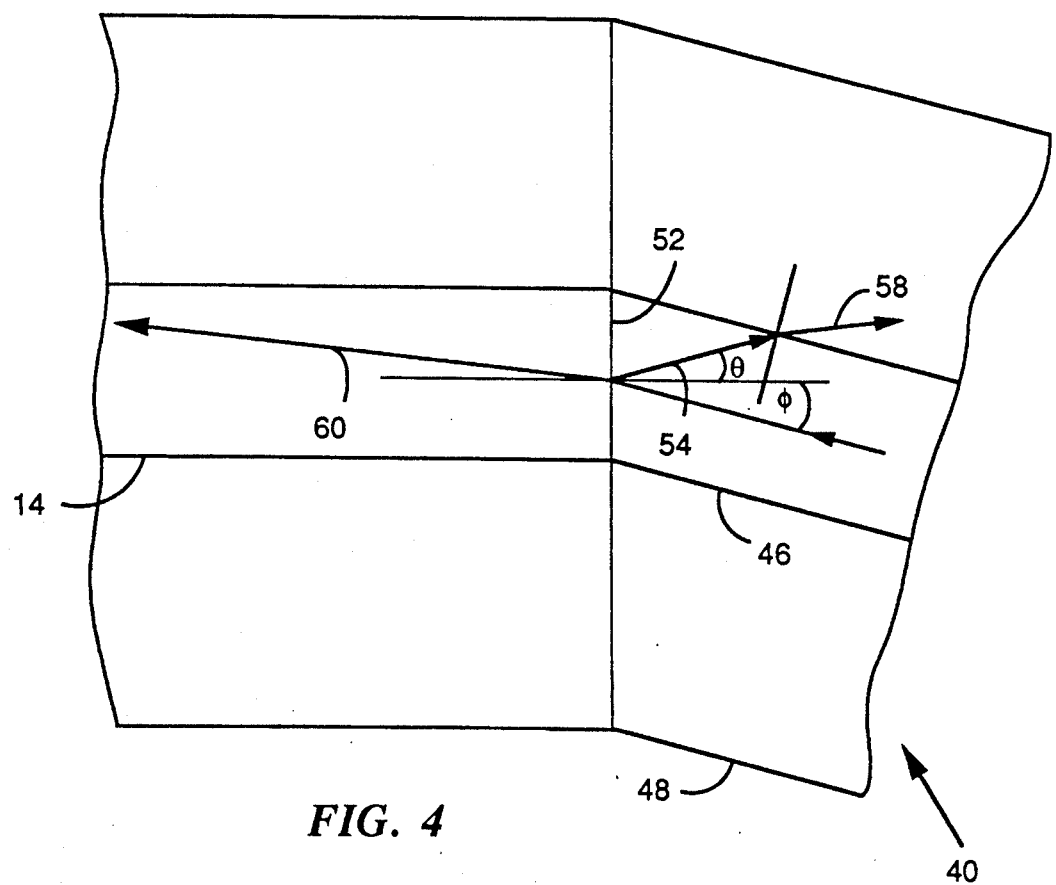
FIG. 4 schematically illustrates the connection between the end of an optical fiber and one of the waveguides formed in the integrated optics chip.

The optical fiber 38 is mounted in the slot 22 and butt-coupled to the waveguide 12. As shown in FIGS. 2, 4 and 5, the optical fiber 40 includes a core 46 and a cladding 48 that surrounds the core 46. The core and cladding are not shown to scale in the drawings. The cladding diameter is many times larger than the core diameter.

Figure 6:
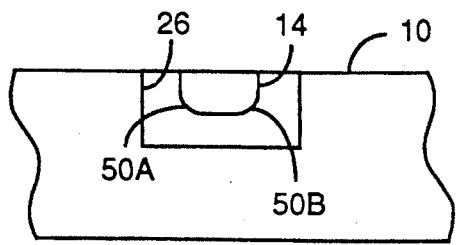
FIG. 6 is an end view of a portion of the integrated optics chip of FIGS. 1-3 showing an integrated optics waveguide.

FIG. 6 illustrates the end of the slot 26 and the waveguide 14. All of the waveguides 12, 14 and 16 may be formed to be substantially identical. Therefore, the description of the waveguide 14 applies also to the waveguides 12 and 16. The waveguide 14 may be generally rectangular in cross section. The waveguide 14 has corners 50A and 50B inside the substrate 10 that may be somewhat rounded as illustrated in FIG. 6. The cross sectional area of the waveguide 14 preferably is about the same as the cross sectional area of the core 46 to provide efficient coupling of light between the waveguide 14 and the optical fiber 40.

The width of the slot 26 as seen in FIG. 6 is preferably slightly larger than the diameter of the cladding 48. The end 42 of the optical fiber 40 may be mounted in the slot 26 by a variety of techniques. One readily available technique for securing the fiber in the slot is the use of an adhesive such as epoxy resin. Another suitable technique involves placing a dielectric such as fused silica in the slot 26 and around the optical fiber 40. Still another suitable technique includes the steps of depositing a metal film in the slot 26, metallizing the end 44 of the optical fiber and placing the metallized fiber in the slot.

Referring to FIG. 3, the optical signal source 36 and the optical fiber 38 are arranged so that the optical fiber 38 receives optical signals output from the optical signal source 36 and guides them to the waveguide 12. The waveguide 12 guides the light from the optical signal source 36 to the junction 18 where the source light divides between the waveguides 14 and 16. The ends 42 and 44 of the optical fiber sensing coil 41 are mounted in the slots 26 and 28, respectively so that the ends of the optical fiber sensing coil 41 are butt-coupled to the corresponding waveguides. Light from the source therefore exits the waveguides 14 and 16 and enters the ends 42 and 44, respectively, of the optical fiber sensing coil 41 to form the two counterpropagating waves that are required for detection of rotation by means of the Sagnac effect. As seen in FIG. 3, the light input to the end 42 of the optical fiber sensing coil 41 forms the counterclockwise wave and the light input to the end 44 forms the clockwise wave.

The counterpropagating waves travel through the optical fiber sensing coil 41 and experience a phase shift if the optical fiber sensing coil 41 is rotating about a line perpendicular to the plane of the coil. The clockwise wave then enters the waveguide 16, and the counterclockwise wave enters the waveguide 14. The phase shifted waves then propagate to the junction 18 where they combine to form an interference pattern. A fiber optic coupler 49 may be employed to couple the combined waves out of the fiber 38 and into an optical fiber 39. The fiber 39 guides the light to a detector 53 that forms an electrical signal indicative of the interference pattern. Signal processing circuitry then determines the rotation rate of the optical fiber sensing coil 41.

Referring to FIG. 4, the mounting of the waveguide 14 in the slot 26 is shown in greater detail than in FIG. 3. The core of the optical fiber sensing coil 41 has a refractive index of about $n_1 = 1.45$ whereas the waveguide 14 has a refractive index of about $n_2 = 2.2$. It is well-known from electromagnetic theory that when light impinges upon an interface between dielectric materials having different refractive indices, part of the light refracts across the interface from one material into the other and the remainder of the light reflects from the interface. This reflection is sometimes called Fresnel reflection. The fraction of the light reflected is characterized by a reflection coefficient. For normal incidence upon the interface the reflection coefficient is $$R = \left| \frac{n_2 - n_1}{n_2 + n_1} \right| = \frac{2.2 - 1.45}{2.2 + 1.45} \approx 0.21,$$

which means that about 21% of the incident light would be reflected back into the optical fiber sensing coil 41 when the light impinges upon the waveguides after traversing the optical fiber sensing coil 41. This reflection of the waves back into the optical fiber sensing coil 41 mixes the clockwise and counterclockwise waves and causes serious errors in the output of optical fiber rotation sensing systems.

In order to minimize the amount of reflected light that remains in the optical fiber sensing coil 41, the slots are formed so that the light is incident upon the optical fiber/waveguide interface at an angle of 10° to 15° as shown in FIGS. 2 and 4. The end of the optical fiber sensing coil 41 and the waveguide 14 are butt-coupled so that the core 46 of the fiber is aligned with the waveguide.

The arrow 51 represents light propagating in the core 46 toward the interface 52 between the core 46 and the waveguide 14. Part of the light propagating in the fiber toward the interface 52 will be refracted into the waveguide 14, and part of the light will be reflected. The arrow 54 represents the light reflected at the interface 52. The arrow 56 represents the portion of the reflected light that exits the core 46 by refracting at the core/cladding interface. The arrow 58 represents the portion of the light that reflects at the interface 52 that remains guided by the core 46. The arrow 60 represents the portion of the incident light that refracts at the interface 52 to travel from the optical fiber 40 into the waveguide 14.

According to Snell's law of reflection, the angle $\theta$ of the reflected light relative to the normal to the interface 52 equals the angle $\phi$ of incidence. Most of this reflected light will then strike the core/cladding interface at an angle less than the critical angle for total internal reflection and will therefore refract out of the core into the cladding. A small part of the light incident upon the core/cladding interface will reflect into the core at an angle such that will permit the core to guide it. Surface irregularities at the interface will scatter some of light back into the core at an angle such that the core will guide a small portion of the scattered light. However, having the light incident upon the fiber/waveguide interface at an angle of 10° to 15° reduces the reflected light by about 60 dB.

However, the birefringence of the waveguides and the optical fibers presents additional difficulties that the present invention overcomes. The optical signals have two orthogonal linear polarization components. Birefringence causes the two polarization components to have slightly different propagation velocities. Previous attempts to construct optical fiber rotation sensors have involved aligning the axes of birefringence of the optical fiber sensing coil 41 with those of the waveguides 14 and 16. Misalignment of the axes of the fiber and the waveguides to which it is butt-coupled cause both polarizations in the fiber to have components along both axes in the waveguide. Similarly, both polarizations in the waveguide have components along both axes in the fiber. Therefore, whenever the light signals cross the fiber/waveguide interface, there is a significant cross coupling of the two polarizations. In previous systems this polarization cross coupling causes sinusoidally varying bias errors that cannot be corrected.

The optical signal source used in a typical optical fiber rotation sensing system is a broadband device that outputs optical signals having a coherence length $\lambda_{coh}$ of about 50 μm. Since the waveguides are birefringent, the two polarization components will become decorrelated such that there is no discernible relationship between a polarization component along one of the axes and a polarization component along the other axis. The distance required for the polarization components to decorrelate is the depolarization length.

Aligning the axes of birefringence is very labor intensive and therefor, expensive. It has been found to be impossible to align the fiber axes and the waveguide axes sufficiently close to eliminate polarization cross coupling.

The present invention overcomes the difficulty of polarization cross coupling without placing stringent requirements on the alignment of the axes of birefringence of the waveguides 14 and 16 with those of the ends 42 and 44 of the optical fiber sensing coil 41. The difference of the lengths of the waveguides 14 and 16 is formed to be greater than the coherence length. The difference of the lengths of the waveguides 14 and 16 causes an asymmetry in the polarization cross coupling. Having this asymmetry in the polarization cross coupling reduces the error caused by the cross coupling.

The slots 22, 26 and 28 may be formed by any convenient technique used in fabricating integrated optics chips. In particular, laser driven fusion etching or reactive ion etching processes are suitable for forming the slots. Laser driven fusion has the advantage of providing higher etch rates than other techniques. Reactive ion etching (RIE) is described by David J. Elliot, *Integrated Circuit Fabrication Technology*, p. 282 (McGraw-Hill, 1982). RIE involves accelerating ions and directing them to the substrate where the ions etch the substrate by both physically displacing the substrate material and chemical reactions.

Laser driven fusion etching involves directing radiation to an ionic substrate coated on its surface with a layer of a reactant material. The radiation, which is preferably light from a laser (not shown) causes the reactant material to induce localized melting at the surface of the substrate. This melting of the substrate permits the substrate and reactant to undergo a fusion reaction. A suitable solvent may then be used to remove the product of the fusion reaction. The laser driven fusion etching process is described in detail in U.S. Pat. No. 4,838,989, which issued June 13, 1989 to Ashby et al. The disclosure of U.S. Pat. No. 4,838,989 is hereby incorporated by reference into the present disclosure. Use of laser driven fusion to etch lithium niobate is disclosed by Ashby et al., Appl. Phys. Lett. 49 (8), Aug. 25, 1986, pp 475–477, which is also hereby incorporated by reference into the present disclosure.

As applied to lithium niobate, the laser driven fusion process involves spatially localized melting of $LiNbO_3$ by high power density laser pulses with photon energies in excess of the band gap of $LiNbO_3$ (4.0 eV, 310 nm), which confines power deposition to the surface region. The photon energy must be sufficiently low to permit efficient transmission through a layer of solid potassium fluoride (KF) located on the $LiNbO_3$ surface. The $LiNbO_3$ molten by the laser reacts with the KF to form complex niobium oxyfluoride anions by fusion of the salts. The resulting solid is highly water soluble, whereas $LiNbO_3$ in insoluble in water. Therefore, material may be removed from only the radiated region using water.

Both the reactive ion etch and laser driven fusion techniques produce mirror quality end facets at angles of 10° to 15° on the edges of the integrated optics chip 10 as desired for preventing an excessive amount of light from reflecting back into the sensing coil at the waveguide/fiber interfaces. Techniques previously used for forming coupling grooves involved polishing the edges of the substrate so that an optical fiber may be coupled to a waveguide in the integrated optics chip.

The structures and methods disclosed herein illustrate the principles of the present invention. The invention may be embodied in other specific forms without departing from its spirit or essential characteristics. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic rotation sensor, comprising:
   an optical signal source;
   a substrate formed of a chip of an optically active material;
   first, second and third optical waveguides formed in the substrate to guide optical signals from the optical signal source along selected axes of propagation, first, second and third slots being formed in edges of the integrated optics chip to correspond to the optical waveguides such that an end wall of each slot includes an end surface of the corresponding optical waveguide, the end surfaces of the optical waveguides being formed to make selected angles with the axes of propagation of light in the optical waveguides to reduce the effects of light reflected at the end surfaces of the optical waveguides in the direction of propagation of light in the optical waveguides, the first second and third optical waveguide being connected at a junction to form a Y-coupler such that optical signals input to the integrated optics chip at the first optical waveguide propagate to the Y-coupler and divide between the first and second optical waveguides and optical signals input to the integrated optics chip at the second and third optical waveguides combine at the Y-coupler and interfere with one another, the second and third optical waveguides having different optical path lengths from the junction to their respective end surfaces to reduce polarization cross coupling;
   a first optical fiber mounted in the first slot to guide light from the optical signal source to the first optical waveguide;
   an optical fiber sensing coil having its ends mounted in the second and third slots, the optical fibers being butt-coupled to the end surfaces of the optical waveguides to form interfaces where light may propagate between the optical waveguide and the optical fiber, the angles of the end of the optical waveguides being formed such that a portion of the light reflected at the interfaces back into the optical fibers refracts into the cladding;
   means for controlling the polarization of light guided by the optical waveguides;
   means for modulating the phase of light guided by the optical waveguides;
   means for detecting the interference pattern of light waves that combine in the Y-coupler; and
   signal processing means for determining the rotation rate of the optical fiber sensing coil.

2. An integrated optics chip, comprising:
   a substrate formed of an optically active material and having a slot formed therein;
   an optical waveguide formed in the integrated optics chip to guide optical signals along a selected axis of propagation such that an end wall of the slot includes an end surface of the optical waveguide, the end wall of the slot surface of the optical waveguide being formed to make an angle with the direction of propagation of light in the optical waveguide to reduce the amount of light reflected at the end surface of the optical waveguide along the selected axis of propagation; and
   a length of an optical fiber placed within the slot, the optical fiber having a core and a cladding surrounding the core, the optical fiber being butt-coupled to the end surface of the optical waveguide to form an interface such that light may propagate between the optical waveguide and the optical fiber, the angle of the end of the optical waveguide being formed such that light reflected at the interface back into the optical fiber impinges on the core/cladding boundary at an angle that permits refraction from the core into the cladding.

3. The integrated optics chip of claim 2 wherein the optical signals input to the first waveguide have a predetermined coherence length and the second and third optical waveguides have a difference in length that exceeds the coherence length of the optical signals input to the first optical waveguide.

4. The integrated optics chip of claim 2 wherein the angle of the end wall of the slot is in the range of 5° to 25°.

5. An integrated optics chip, comprising:
   a substrate formed of an optically active material;
   first, second and third optical waveguides formed in the substrate to guide optical signals along selected axes of propagation, first, second and third slots being formed in edges of the integrated optics chip to correspond to the optical waveguides such that an end wall of each slot includes an end surface of the corresponding optical waveguide, the end surfaces of the optical waveguides being formed to make selected angles with the axes of propagation of light in the optical waveguides to reduce the effects of light reflected at the end surfaces of the optical waveguides in the direction of propagation of light in the optical waveguide, the first second and third optical waveguide being connected at a junction to form a Y-coupler such that optical signals input to the integrated optics chip at the first optical waveguide propagate to the Y-coupler and divide between the second and third optical waveguides and optical signals input to the integrated optics chip at the second and third optical waveguides combine at the Y-coupler and interfere with one another, the second and third optical waveguides having different optical path lengths from the junction to their respective end surfaces.

6. The integrated optics chip of claim 5 wherein the optical signals input to the first waveguide have a predetermined coherence length and the second and third optical waveguides have a difference in length that exceeds the coherence length of the optical signals input to the first optical waveguide.

7. The integrated optics chip of claim 5 wherein each slot is formed to receive therein a length of a corresponding optical fiber, each optical fiber having a core and a cladding surrounding the core, the optical fibers being butt-coupled to the end surfaces of the optical waveguides to form interfaces where light may propagate between the optical waveguide and the optical fiber, the angles of the end of the optical waveguides being formed such that light reflected at the interfaces back into the optical fiber impinges on the core/cladding boundary at an angle that permits refraction from the core into the cladding.

8. The integrated optics chip of claim 7 wherein the angle of the end of the optical waveguide is in the range of 5° to 25°.

* * * * *